April 14, 1959 L. I. CRUMLEY 2,881,815
SECONDARY CHOPPING UNIT, SELF FEEDER MOUNTED
Filed Oct. 22, 1956 2 Sheets-Sheet 1

INVENTOR.
Lloyd Ira Crumley
BY
ATTORNEY.

April 14, 1959     L. I. CRUMLEY     2,881,815
SECONDARY CHOPPING UNIT, SELF FEEDER MOUNTED
Filed Oct. 22, 1956     2 Sheets-Sheet 2
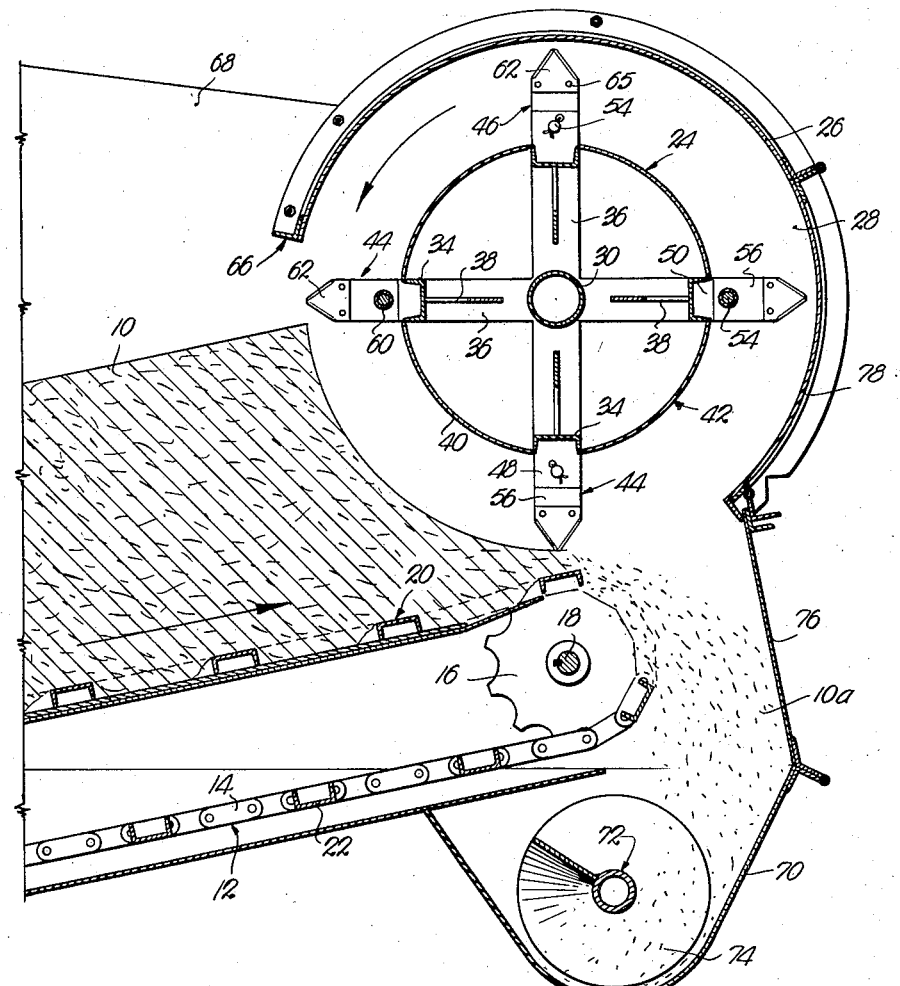
Fig. 2.
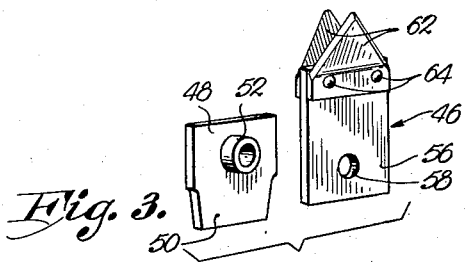
Fig. 3.
INVENTOR.
Lloyd Ira Crumley
BY
ATTORNEY.

2,881,815

United States Patent Office

Patented Apr. 14, 1959

2,881,815

SECONDARY CHOPPING UNIT, SELF FEEDER MOUNTED

Lloyd Ira Crumley, Fredonia, Kans., assignor to Archer-Daniels-Midland Company, Minneapolis, Minn., a corporation of Delaware Application October 22, 1956, Serial No. 617,513

2 Claims. (Cl. 146—119)

This invention relates to a material handling machine, and more particularly to apparatus for dividing chopped hay such as alfalfa, into finely divided particles prior to dehydration.

In the field to which the instant invention relates, it is common practice to field-chop alfalfa and other hay products prior to dehydration, but in practice, the dehydration process has been relatively expensive and time consuming and the end product has not been entirely satisfactory because of the inability of the field choppers to divide the hay into sufficiently small particles.

It is the most important object of the instant invention, therefore, to provide apparatus capable of quickly, inexpensively and efficiently reducing the chopped hay to a proper particle size immediately prior to dehydration and following the field chopping operations.

Another important object of the present invention is to provide a material handling machine that is entirely automatic in its operation by virtue of the fact that it requires merely unloading of the chopped hay onto a continuously moving conveyor that in turn feeds the material to the cutter means of a rotatable chopper disposed to act upon the chopped hay while the same is advanced by the conveyor and as it emanates from the discharge end of the conveyor.

A further object of the instant invention is to provide a secondary chopping unit for alfalfa hay and the like operable in conjunction with a conveyor in the manner aforementioned so as to minimize handling of the material by virtue of the fact that it is chopped on the conveyor as above indicated, and further, because of the fact that the finely divided particles are thereupon immediately collected from the chopper and the conveyor for final advancement from a receiver toward or directly into the dehydrator.

A still further important object of the instant invention is the provision of a pair of conveyors operable in conjunction with a chopper in a manner to permit accurate determination of particle size simply by variance in the speed of rotation of the continuous conveyor which advances the chopped hay to the cutter blades of the chopping unit.

Additional features of the present invention relate to important details of construction and novel arrangement of parts, all of which will be made clear or become apparent as the following specification progresses, reference being made to the accompanying drawings, wherein:

Fig. 2 is a fragmentary, transverse, vertical cross-sectional view taken on line II—II of Figure 1 looking in the direction of the arrows; and Fig. 3 is a perspective view illustrating one of the chopping units of the chopper, together with one of the mounting plates for attaching the cutter units to the chopping drum.

Figure 1:
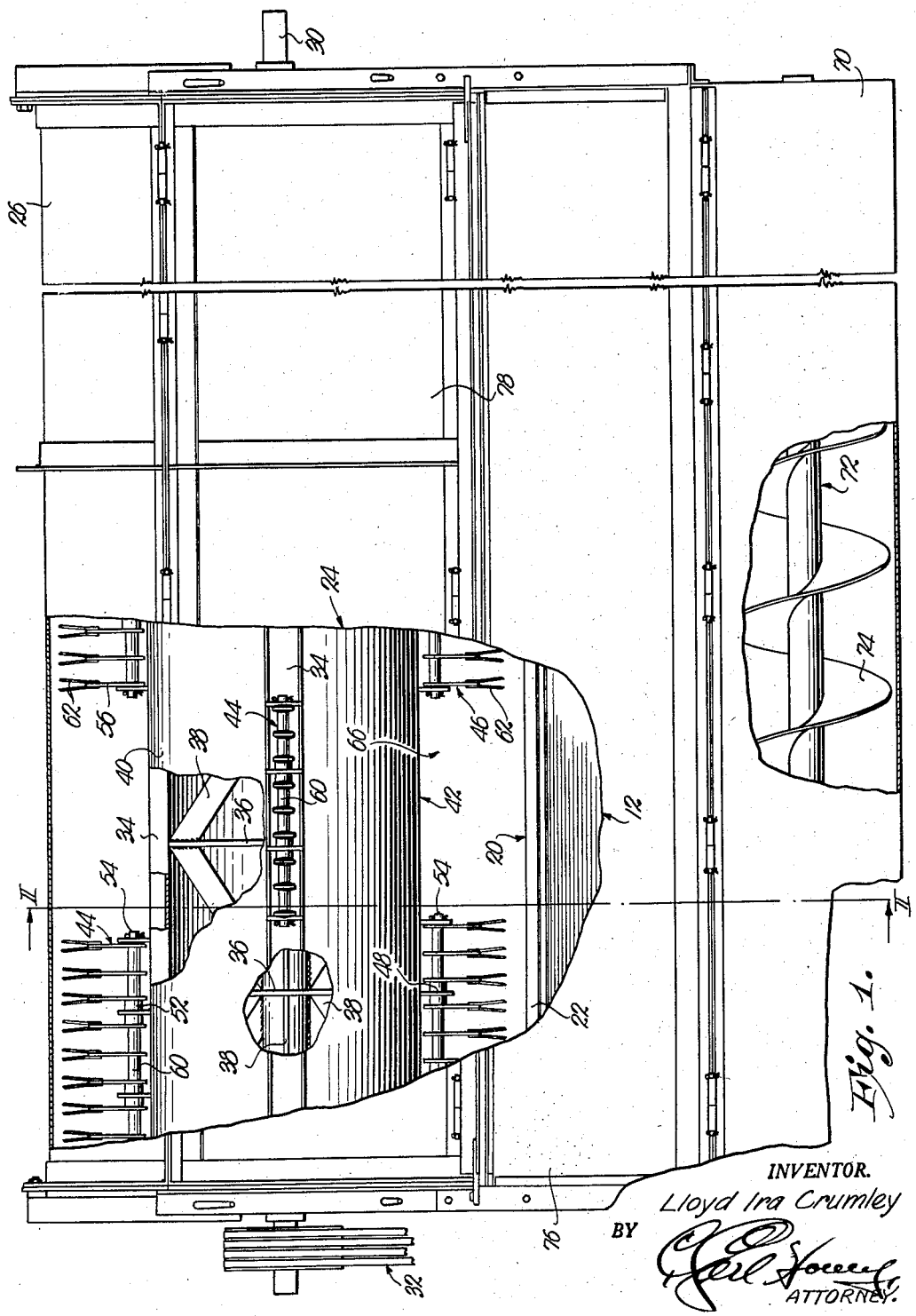
Figure 1 is an elevational view of a secondary chopping unit, self feeder mounted, made pursuant to my present invention, parts being broken away and in section to reveal details of construction.

As above indicated, the machine about to be described and illustrated in the drawings, has been designed particularly for handling chopped alfalfa hay and similar products shown in Fig. 2 and designated by the numeral 10. Preferably, the machine is located next, adjacent, or in close proximity to a dehydrator to the end that the finished product may be fed directly into the dehydrator, to a secondary conveyor or to a suitable feeder means forming a part of the dehydrator.

The hay is normally cut and immediately chopped in the field and the secondary chopping unit of the instant invention is designed to receive such chopped hay 10 from trucks, trailers and the like employed to haul the same from the field choppers to the point of dehydration.

Accordingly, pursuant to the concepts of the instant invention, it is but necessary to unload the chopped hay 10 onto a continuous conveyor 12 that may be substantially of conventional character as best seen in Fig. 2. The continuously rotating conveyor 12 is provided with two or more chains 14 trained about sprocket wheels 16 that are in turn rigidly secured to a pair of opposed, horizontal shafts, one of which may be seen in Fig. 2 and designated by the numeral 18.

Conveyor 12 is provided with an uppermost flight 20 that receives the material 10 and conveyor 12 is advantageously provided with a plurality of spaced cross elements 22 secured to the chains 14 thereof.

It is to be particularly noted that the discharge end of conveyor 12 is disposed directly beneath a chopper broadly designated by the numeral 24 and mounted for rotation on a horizontal axis and substantially parallel to and directly above the axis of rotation of shaft 18. The chopper 24 is partially covered by or enclosed within an elongated, horizontal drum or cylinder 26, having end walls, one of which can be seen in Fig. 2 and designated by the numeral 28. The said end walls of the drum 26 support an elongated, horizontal shaft 30 forming a part of the chopper 24 and to which is operably connected belt and pulley means or the like 32 for driving the chopper 24 from a suitable prime mover not shown.

In addition to the shaft 30, chopper 24 includes a plurality of outwardly facing, longitudinal channel beams 34 in spaced parallelism to the shaft 30 and coextensive in length therewith. The channel beams 34 are supported by a number of radial arms 36 connected with shaft 30 and suitably reinforced by angle braces 38. The beams 34 are in turn interconnected by segments 40 of a tube 42 which enclose the arms 36 and the braces 38, the tube 42 being closed at its ends if desired.

The chopper 24 is preferably coextensive in length with the drum 26 and is provided at its periphery throughout the length thereof with a plurality of chopper sections 44, each of which includes a number of chopping units 46 that are secured to the channel beams 34 through the medium of a number of mounting plates 48. Each mounting plate 48 has an innermost end 50 of reduced width that fits into the channel beam 34 and is welded or otherwise permanently affixed thereto. Certain of the plates 48 are provided with a pair of opposed bearings 52 firmly attached to opposite faces thereof which journal a pin 54, there being a pin 54 for each section 44 respectively.

Cutter units 46 include elongated bars 56 each having an opening 58 receiving the pin 54. The bearings 52 serve as spacers for proximal bars 56 and additional spacers 60 are threaded on the pins 54 as best seen in Figure 1.

Each bar 56 is in turn provided with a pair of triangular cutters 62 rigidly attached to opposite faces thereof at the outermost terminal ends of the bars 56, it being noted that the cutters 62 diverge as the outermost apex ends thereof are approached. Rivets or other fasteners 64 removably secure the cutters 62 to the bars 56 for replacement as becomes necessary.

It is manifest from viewing Figure 1 that each of the channel beams 34 is provided with a plurality of sections 44 disposed in spaced relationship throughout the lengths thereof. Preferably also, the sections 44 of each beam 34 are in staggered relationship to the sections 44 of next adjacent beams 34.

The width of conveyor 12 is preferably equal to the length of a clearance opening 66 formed in the drum 26 and such opening 66 is in turn preferably coextensive in length with the drum 26. Opening 66 is disposed along the bottom and along one side of the drum 26 above the discharge head of conveyor 12, thereby exposing a substantial portion of the chopper 24 to the material 10 being fed thereto by conveyor 12. The clearance opening 66 also extends beyond the discharge end of conveyor 12 a distance sufficient to clear the finely divided material 10a as it emanates from the chopping units 46 and from the discharge end of conveyor 12. A suitable trough, hopper or hood 68 embracing the conveyor 12 and communicating with the opening 66 of drum 26, may be provided to guide the material 10 as it is fed to the chopper 24 by conveyor 12.

It is desirable also that the finely divided hay 10a be collected by a hollow receiver 70 at least coextensive in length with the opening 66 and with the width of the conveyor 12. Receiver 70 communicates directly with opening 66 and partially underlies the conveyor 12 at its discharge end and is provided with conveyor means 72 extending longitudinally thereof and desirably taking the form of an auger 74. One end of the receiver 70 is open at the discharge end of the conveyor 72 and may register directly with a dehydrator (not shown) or with additional conveyor means for advancing the chopped material 10a from the receiver 70 onto the dehydrator. Any suitable means (not illustrated) may be provided for continuously driving the conveyor 12 and the conveyor 72.

While in some instances, it may be necessary or desirable to provide for means to individually vary the speeds of rotation of the conveyor 12, the chopper 24 and the conveyor 72, it is highly desirable to vary the speed of the conveyor 12. By so doing, the rate of feeding of the material 10 to the chopper 24 may be varied, which in turn determines in part the particle size of the material 10a collected by receiver 70.

For the most part, the chopped hay 10 is subdivided into smaller particles while the same is supported by the conveyor 12 and prior to discharge from the conveyor 12 into the receiver 70. However, the rotating chopper 24 will manifestly tend to carry some of the material 10 therewith as the chopper 24 rotates anti-clockwise viewing Fig. 2, and such carried material is confined within the drum 26 for ultimate discharge into the receiver 70. In any event, by virtue of the novel construction of the chopper 24 itself, there will be little, if any, entanglement of the material 10 within the chopper 24 since the tube 24 houses not only the shaft 30 but the supporting arms 36 and the structural reinforcing means 38. The outermost apex ends of the cutters 62 are preferably disposed in close proximity to the inner circular surface of the drum 26 to cut away any tendency of the material to collect and cake on the drum 26 therewithin.

The provision of the large number of spaced-apart cutters 62 throughout the length of the cutter 24 striking the material 10 transversely thereof, assures the sub-dividing of virtually every particle of the chopped hay 10, each of which is actually contacted and severed several times during advancement to the discharge end of the conveyor 12 and into the receiver 70. In this respect, it is to be noted that the downward and inward striking force of the cutters 62 upon the material 10 as it moves into the opening 66, and as the heavily packed chopped hay 10 is supported by the conveyor 12, eliminates undue loosening and scattering of the material which would otherwise tend to cause the same to be carried around the drum 26 without being subjected to the cutting action of the cutters 62 prior to discharge into the receiver 70.

It is apparent also, that the machine is entirely automatic and may be placed in use for continuous operation without operator attention. However, the operating parts are all rendered accessible for clearing and/or other attention as may be desired or necessary by virtue of the fact that the receiver 70 is provided with a hingedly mounted access panel 76 and drum 26 is similarly provided with a swingable access section 78.

Having thus described the invention what is claimed as new and desired to be secured by Letters Patent is:

1. In a material handling machine having a hollow, cylindrical drum provided with walls closing the ends thereof, a chopper mounted within the drum, said chopper comprising a horizontal, rotatable shaft supported by said end walls; a plurality of outwardly facing, longitudinal channel members in spaced parallelism with said shaft; arms rigidly interconnecting each of said members with said shaft; arcuate segments joining said members whereby to form a tube having a continuous outer wall; a plurality of mounting plates seated within and secured to each of said members respectively; chopper sections carried by the mounting plates of each member respectively, each of said sections being circumferentially offset with respect to the sections carried by the mounting plates of the next adjacent member and including a number of chopping units, each of said units having a bar and a pair of cutters; and a pin for each section respectively, the chopping units of each section being swingably mounted on their corresponding pins.

2. In a material handling machine having a hollow, cylindrical drum provided with end walls, a chopper mounted within the drum, said chopper comprising a horizontal, rotatable shaft supported by said end walls; a plurality of outwardly facing, longitudinal channel members co-extensive in length with said shaft and in spaced parallelism with respect thereto; radial arms rigidly interconnecting each of said members with said shaft; braces for said arms; arcuate segments joining said members whereby to form a tube having a continuous, imperforate outer wall, said arms and said braces being disposed within the tube; a plurality of mounting plates seated within and secured to each of said members respectively; chopper sections carried by the mounting plates of each member respectively, each of said sections being circumferentially offset with respect to the sections carried by the mounting plates of the next adjacent member and including a number of chopping units, each of said units having a bar and a pair of opposed, triangular cutters rigidly attached to the outermost end of the bar; and a pin for each section respectively, the chopping units of each section being swingably mounted on their corresponding pin.

References Cited in the file of this patent

UNITED STATES PATENTS

| | | |
|---|---|---|
| 939,777 | Williams | Nov. 9, 1909 |
| 1,558,613 | Holland-Letz et al. | Oct. 27, 1925 |
| 1,928,141 | Stresau | Sept. 26, 1933 |
| 1,996,700 | Fulmer | Apr. 2, 1935 |
| 2,137,388 | Chapman | Nov. 22, 1938 |
| 2,711,067 | Mott | June 21, 1955 |
| 2,723,669 | Pool et al. | Nov. 15, 1955 |

FOREIGN PATENTS

| | | |
|---|---|---|
| 377,342 | France | July 8, 1907 |